United States Patent
Shavit et al.

(10) Patent No.: US 8,787,403 B2
(45) Date of Patent: Jul. 22, 2014

(54) AUDIO CONVERGENCE CONTROL FACILITATING BITPOOL VALUE CONVERGING TO STABLE LEVEL

(75) Inventors: Yonathan Shavit, Hod Hasharon (IL); Alon Paycher, Moshav Beith-Hananya (IL); Yaniv Rabin, Zur Hadassa (IL); Dotan Ziv, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 155 days.

(21) Appl. No.: 13/470,832

(22) Filed: May 14, 2012

(65) Prior Publication Data

US 2013/0304458 A1 Nov. 14, 2013

(51) Int. Cl.
*H04J 3/16* (2006.01)

(52) U.S. Cl.
USPC ............ 370/468; 370/338; 370/252; 455/412

(58) Field of Classification Search
USPC ........................................................ 455/41.2
See application file for complete search history.

(56) References Cited

U.S. PATENT DOCUMENTS

| | | |
|---|---|---|
| 2008/0287063 A1 | 11/2008 | Kidron et al. |
| 2009/0099851 A1 | 4/2009 | Pilati et al. |
| 2009/0176452 A1* | 7/2009 | Hillyard ...................... 455/41.2 |
| 2010/0161761 A1* | 6/2010 | Yu et al. ........................ 709/219 |

* cited by examiner

*Primary Examiner* — Duc C Ho
(74) *Attorney, Agent, or Firm* — Lawrence J. Bassuk; Frederick J. Telecky, Jr.

(57) ABSTRACT

A system includes a controller that provides an output control signal based on two or more control inputs. The controller determines an indication of radio frequency (RF) bandwidth availability based on a given one of the control inputs. The output control signal can correspond to the RF bandwidth availability and status of at least one other wireless condition affecting RF bandwidth. An audio quality adjuster can adjust quality parameters used to encode an audio stream for one or more audio sinks based on the output control signal.

15 Claims, 3 Drawing Sheets

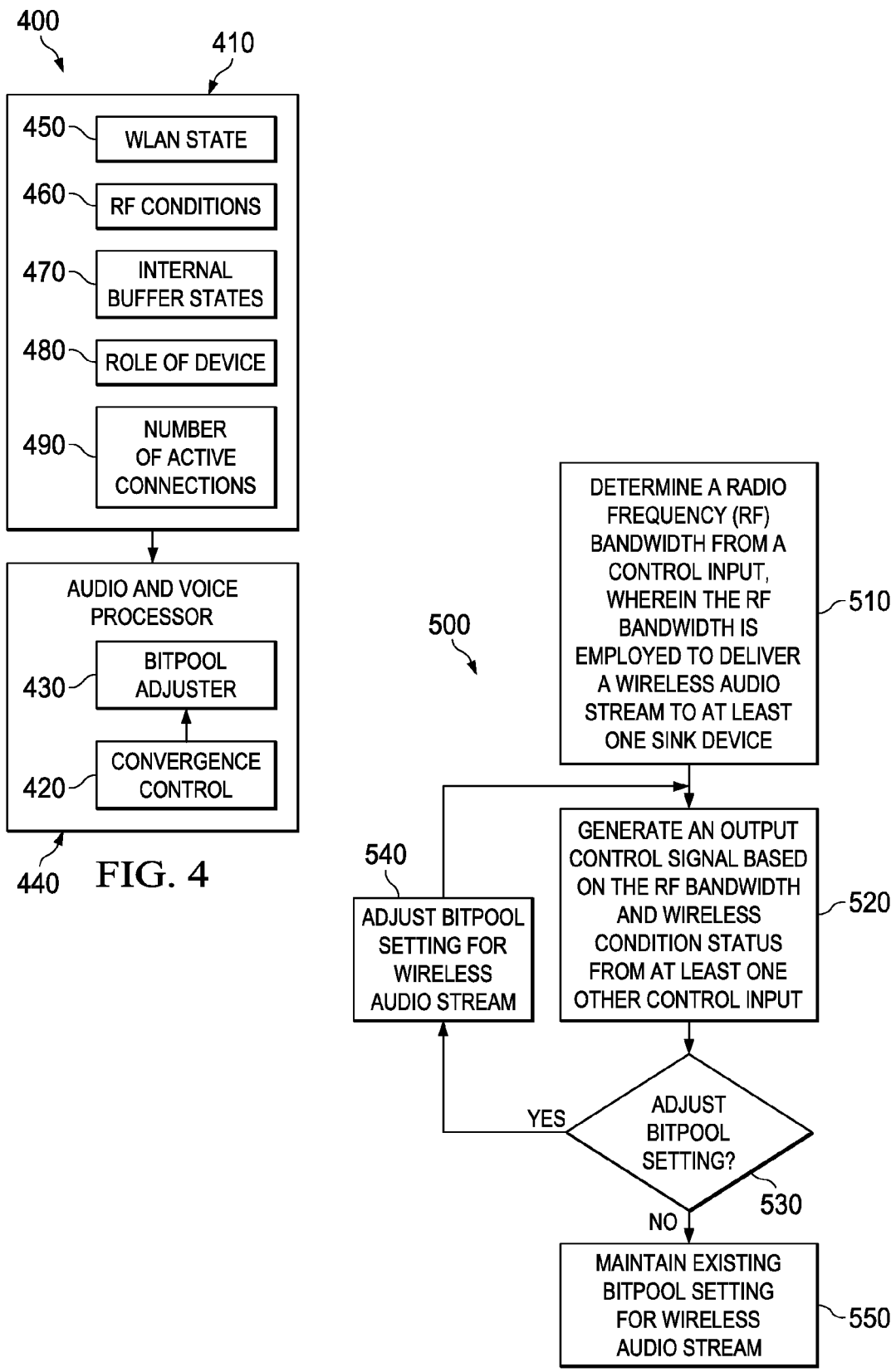

AUDIO CONVERGENCE CONTROL FACILITATING BITPOOL VALUE CONVERGING TO STABLE LEVEL

TECHNICAL FIELD

This disclosure relates to audio and to systems and methods to adjust audio quality based on bandwidth.

BACKGROUND

The Advanced Audio Distribution Profile (A2DP) defines protocols and procedures that realize distribution of audio content of high-quality in mono or stereo on streaming data channels. A typical usage case is the streaming of music content from a stereo music player to headphones or speakers which can include wireless connections between the streaming device and headphones, for example. The audio data with respect to the A2DP profile can be compressed in a proper format for efficient use of limited bandwidth. In one example, A2DP allows creation of Bluetooth channels through which advanced audio data can be streamed from one Bluetooth-enabled device to another Bluetooth-enabled device. Two roles are generally defined for Bluetooth-enabled devices that support A2DP. One role includes a source (SRC) role where a device is the SRC when it is the source of a digital-audio data and sends the stream to a sink (SNK) for example, such as a portable navigation device (PND) or wireless receiver such as a headphone. The sink (SNK) role defines a device when it receives the digital-audio stream delivered from the SRC such as an in-car media player, for example.

SUMMARY

This disclosure relates to audio and to systems and methods to adjust audio quality based on bandwidth.

Systems and methods are provided that include dynamic audio controls for bandwidth compensation. In one example, a system includes a controller that provides an output control signal based on two or more control inputs. The controller determines an indication of radio frequency (RF) bandwidth availability based on a given one of the control inputs. The output control signal can correspond to the RF bandwidth availability and status of at least one other wireless condition affecting RF bandwidth. An audio quality adjuster can adjust quality parameters used to encode an audio stream for one or more audio sinks based on the output control signal.

In another example, a method includes determining a radio frequency (RF) bandwidth from a control input, wherein the RF bandwidth is employed to deliver a wireless audio stream to at least one sink device. The method includes generating an output control signal based on the RF bandwidth and wireless condition status from at least one other control input. This includes dynamically adjusting a bitpool setting in response to the output control signal to control a quality of the wireless audio stream.

In yet another example, a device includes an audio and voice processor (AVPR) to communicate to a host system to determine existing wireless signal conditions. A Bluetooth central processing unit (CPU) communicates with the AVPR to deliver audio streams to one or more audio sinks. A bitpool adjuster associated with the AVPR adjusts an audio quality parameter of the audio streams based in part on the determined wireless signal conditions.

BRIEF DESCRIPTION OF THE DRAWINGS

FIG. 4 illustrates an example system that processes control inputs and employs convergence control with a bitpool adjuster for dynamic audio control and bandwidth compensation.

FIG. 5 illustrates an example method that provides dynamic audio control for bandwidth compensation.

DETAILED DESCRIPTION

Figure 1:
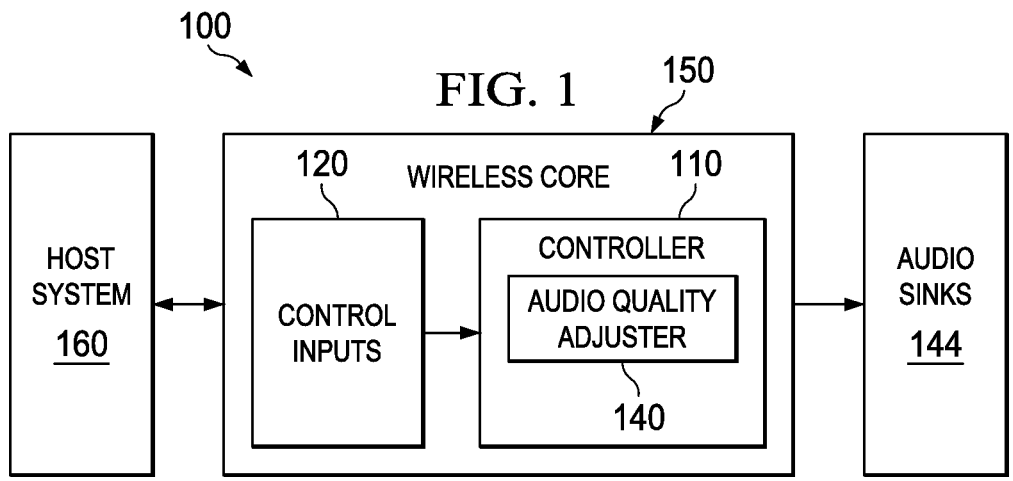
FIG. 1 illustrates an example system that provides dynamic audio control for bandwidth compensation.

FIG. 1 illustrates an example system 100 that provides dynamic audio control for bandwidth compensation. The system 100 includes a controller 110 that provides an output control signal based on two or more control inputs 120. The controller 110 determines an indication of radio frequency (RF) bandwidth availability based on a given one of the control inputs 120. Also, the output control signal can correspond to the RF bandwidth availability and status of at least one other wireless condition (e.g., WLAN state, buffer status, SNK status) affecting RF bandwidth. An audio quality adjuster 140 adjusts quality parameters used to encode an audio stream for one or more audio sinks 144 based on the output control signal.

For example, if radio frequency (RF) channel bandwidth is detected as less than optimal via the control inputs 120, the controller 110 can command the audio quality adjuster 140 to reduce audio quality to the audio sinks 144 in order to compensate for the detected bandwidth. In general, the human ear cannot detect subtle adjustments in sound quality but the delivery of the data stream can be smoothed by increasing streaming delivery capabilities to the audio sinks 144. As will be described below with respect to FIG. 2, a bandwidth dependent bitpool can be employed as the audio quality adjuster 140, in one example.

The controller 110 (e.g., audio & voice processor) and audio quality adjuster 140 can be implemented as an algorithm and/or processor circuit on a wireless core 150 that communicates with a host system 160 (e.g., cell phone, digital sound device, personal computer) to provide audio streams to the audio sinks 144. By implementing dynamic audio controls via the controller 110 and audio quality adjuster 140 at the wireless core 150 as opposed to the host level, system performance can be improved since the controller can efficiently command audio quality up or down via the audio quality adjuster in view of detected control inputs 120.

In one specific example that will be illustrated and described below with respect to FIG. 2, the controller 110 can adjust the streaming audio quality to the audio sinks 144 according to the detected Bluetooth available bandwidth enabling the end user experience to be improved. The controller 110 and audio quality adjuster 140 can be embedded in a Bluetooth Controller chip, for example, as part of an assisted audio control in which the audio encoding of Advanced Audio Distribution Profile (A2DP) can be implemented in the Bluetooth Controller device. The low level implementation (e.g., Bluetooth chip embedded) enables high sensitivity to Bluetooth instant bandwidth and improves the control mechanism as compared to other control mechanisms which are implemented in the host system 160 (e.g., cellular platform) layer.

The control inputs 120 can include a wireless local area network (WLAN) state, a Bluetooth state, a packet error rate (PER) indicating radio frequency conditions, an internal inter-process communications state, a role parameter associated with a device (e.g., SNK, SRC, SNK/SRC), or a number of active connections. Based on such control inputs 120, the controller 110 and audio quality adjuster 140 can control a bitpool parameter for audio quality that is dependent on available bandwidth of the wireless signal conditions. The audio quality adjuster 140 can also control a subband codec (SBC) setting to adjust audio quality that includes a sampling frequency parameter, a frame length parameter, or a resulting bit rate parameter, for example. The controller 110 can include an audio and voice processor (AVPR) that tracks inter-process communications states over time and decreases a bitpool size when the size is above a decrease threshold or increases the bitpool size when the size is below an increase threshold, wherein the size is related to available bandwidth. This can include a convergence control to facilitate that the bitpool size converges to a stable level. For instance, the convergence control can include an iterations number parameter to control the number of times that the bitpool size increases or decreases. The convergence control can also include a rate parameter that defines the number of encoding cycles that pass between bitpool size increases or decreases. Also, the convergence control can provide a radio frequency consideration parameter where multiple sink devices are considered and if only one sink is affected by faulty RF conditions, then the bitpool size remains unchanged. The bitpool size can be increased or decreased in a period from about two milliseconds to about three milliseconds (e.g., about 2.67 milliseconds).

In order to be more efficient with respect to WLAN and Bluetooth scheduling during A2DP streaming, a bandwidth dependent bitpool algorithm implemented in the controller 110 as the audio quality adjuster 140 can take into account the current activities running over WLAN and over Bluetooth, for example. For instance, if a file is downloaded using WLAN, this information can serve as a control input 120 to the algorithm and controller 110, which then lowers the bitpool in advance in order to allow suitable WLAN throughput in and acceptable audio streaming quality (e.g., as opposed to very good audio quality and low WLAN throughput). This adjustment method can be applied per Bluetooth/WLAN activity detected, such that the controller 110 can adjust the bitpool per use case. Some common use case examples include WLAN browsing, WLAN FTP, Bluetooth FTP, Bluetooth connection creation to other devices, and so forth.

In cases where RF conditions are detected as poor (e.g., packet error rate detected above a threshold value), the bitpool can be decreased (even before the inter-process communications (IPC) buffer (described below) crosses a buffer threshold). Thus, RF condition deterioration can predict when IPC buffer occupancy may cross the threshold, and therefore increase the algorithm's response to actual bandwidth conditions. In multiple sink scenario (e.g., when two headsets are connected over A2DP), the bitpool is not changed if only one connection suffers from poor quality RF. This condition facilitates that one headset would not harm the audio quality of the other one (e.g., if one headset is out of range the other one can still receive suitable quality, however if both have medium RF quality than the bitpool can be decreased).

For purposes of simplification of explanation, in the present example, different components of the systems described herein are illustrated and described as performing different functions. However, one of ordinary skill in the art will understand and appreciate that the functions of the described components can be performed by different components, and the functionality of several components can be combined and executed on a single component or be further distributed across more components. For example, the controller 110 and audio quality adjuster 140 could be integrated on a single device such as an integrated circuit which could also include memory to control the processor. The components described herein can be implemented, for example, as computer executable instructions (e.g., software, firmware), hardware (e.g., CPU, an application specific integrated circuit), or as a combination of both. In other examples, the components could be distributed among remote devices across a network, for example.

Figure 2:
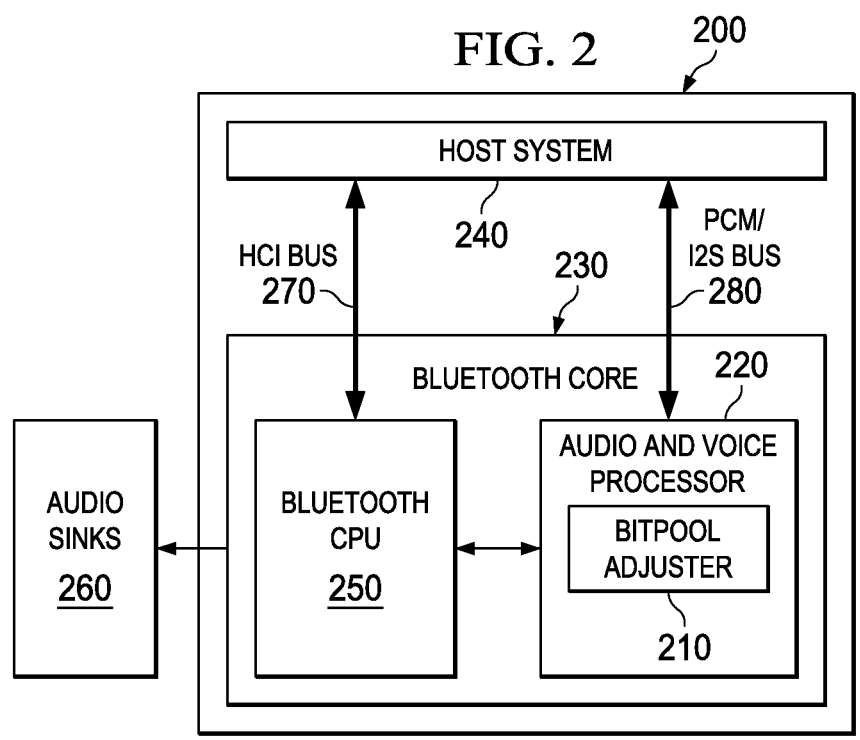
FIG. 2 illustrates an example Bluetooth system that employs a bitpool adjuster to provide dynamic audio control for bandwidth compensation.

FIG. 2 illustrates an example Bluetooth system 200 that employs a bitpool adjuster 210 to provide dynamic audio control for bandwidth compensation. The bitpool adjuster 210 is employed as the audio quality adjuster described above with respect to FIG. 1. An audio & voice processor (AVPR) 220 operates the bitpool adjuster 210 as part of a Bluetooth core 230 that communicates with a host system 240. The bitpool adjuster can be enabled or disabled, for example, in response to a programmable input. The Bluetooth core 230 includes a Bluetooth central processing unit (CPU) 250 that processes data from the AVPR 220 and sends audio streams to one or more audio sinks 260. The Bluetooth CPU 250 can communicate to the host system 240 via a host communications interface (HCI) bus 270 and the AVPR can communicate to the host system 240 via a pulse code modulation (PCM)/I2S bus 280.

The bitpool adjuster 210 controls a bandwidth dependant bitpool that enables audio quality to be increased or decreased in view of detected bandwidth. A range of bitpool values can be provided for the A2DP stream, (e.g., 2 to 250), and can be negotiated as part of the A2PD signaling procedure. The bitpool, along with other codec parameters, determines the bit rate of the audio stream. Example sets of subband codec SBC parameters and bitpool values processed by the AVPR 220 are presented below in Table 1.

TABLE 1

| SBC encoder settings* | Middle Quality | | | | High Quality | | | |
| --- | --- | --- | --- | --- | --- | --- | --- | --- |
| | Mono | | Joint Stereo | | Mono | | Joint Stereo | |
| Sampling frequency (kHz) | 44.1 | 48 | 44.1 | 48 | 44.1 | 48 | 44.1 | 48 |
| Bitpool value | 19 | 18 | 35 | 33 | 31 | 29 | 53 | 51 |
| Resulting frame length (bytes) | 26 | 44 | 83 | 79 | 70 | 66 | 119 | 115 |
| Resulting bit rate (kb/s) | 127 | 132 | 229 | 237 | 193 | 198 | 328 | 345 |

*Other settings: Block length = 16, Allocation method = Loudness, Subbands = 8

As noted, an aspect of the bandwidth dependant bitpool is to provide audio quality adjustment according to bandwidth availability. Thus, when RF performance degrades, or when bandwidth is limited as result of other traffic activities, such as an additional sink device 260, bitpool decreases adaptively down to the minimum negotiated value. Similarly, when there are no channel constraints (e.g., when the physical link improves and so forth), the bitpool can be increased back to the optimal value as will be illustrated below with respect to FIG. 3.

Figure 3:
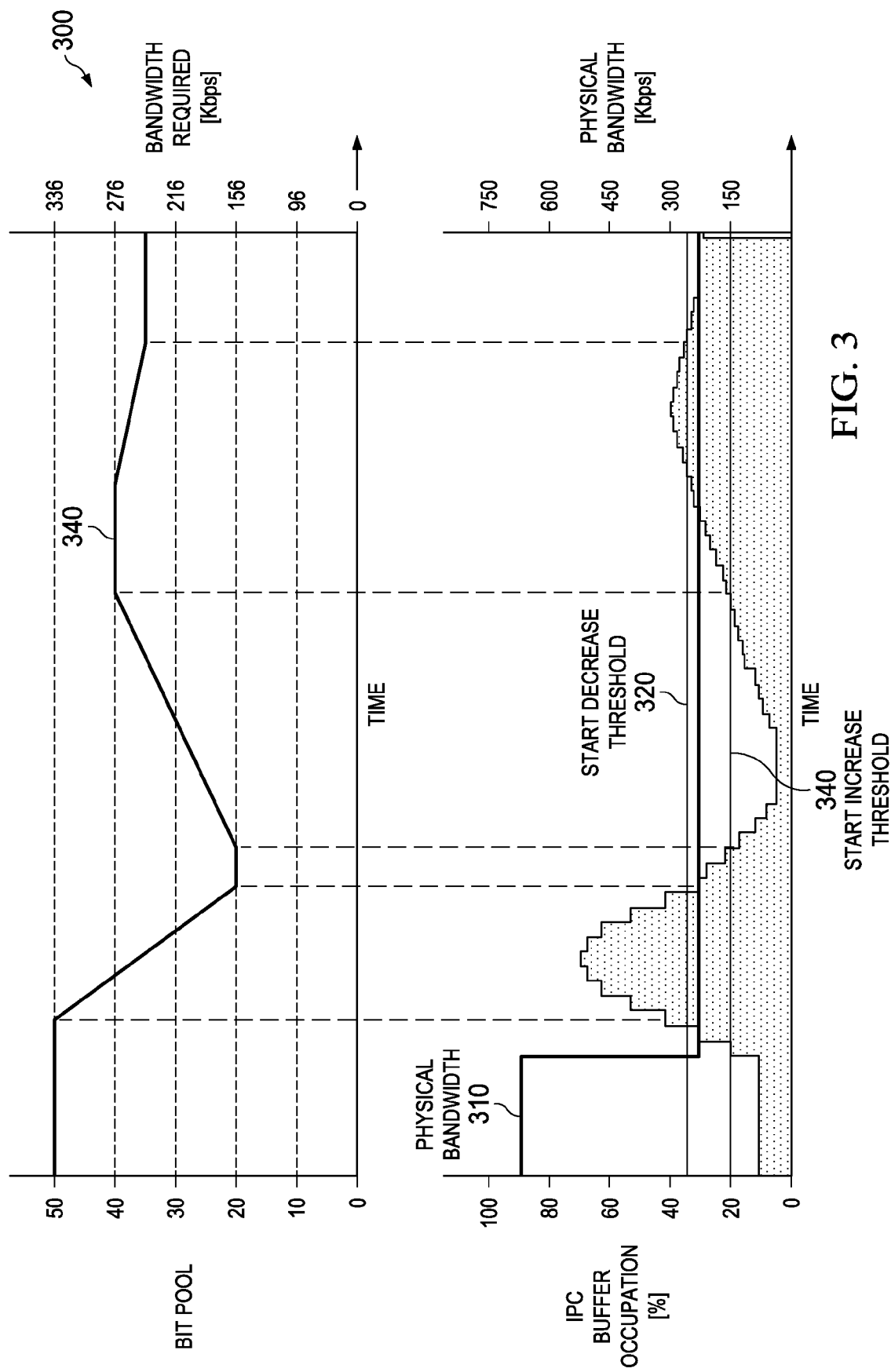
FIG. 3 illustrates and example timing and bandwidth diagram that depicts example bitpool adjustments for dynamic audio control in view of available bandwidth.

FIG. 3 illustrates and example timing and bandwidth diagram 300 that depicts example bitpool adjustments for dynamic audio control in view of available bandwidth. In order to adjust audio quality, bandwidth availability is evaluated according to an inter-process communication (IPC) buffer occupation in a given time as illustrated at 310 of the diagram 300. In cases where physical bandwidth allocation is lower than the current bitpool requirement, the IPC buffer occupation can rise, since more packets are produced than transmitted, for example. In a similar manner, where physical bandwidth allocation is higher than bitpool requirements, this enables IPC buffer depletion. The AVPR described above tracks the IPC states, decreases the bitpool size when its occupation is above a decrease threshold shown at 320 of the diagram 300, and increases the bitpool size when its occupation is below an increase threshold as shown at 330. This adjusting process can be performed periodically, with adjusting increase and decrease rates, until the bitpool size value stabilizes such as shown at 340 of the diagram 300. In this example, the stream's initial bitpool is 50 and the bandwidth allocation is about 700 Kbps which is a typical base rate allocation, when other activities such as scans and sniff exist. When bandwidth allocation drops to about 230 Kbps, IPC buffer occupation rises, and that triggers fast bitpool size decreases. When IPC occupation is lowered again due to a low bitpool value, a bitpool size increase can be triggered. This process continues until bitpool value stabilization is achieved. A convergence process is described below with respect to FIG. 4 to achieve bitpool stabilization.

FIG. 4 illustrates an example system 400 that processes control inputs 410 and employs a convergence control 420 with a bitpool adjuster 430 for dynamic audio control and bandwidth compensation. As shown, the convergence control 420 and bitpool adjuster 430 can be operated within an audio and voice processor (AVPR) 440. The control inputs 410 can include a wireless local area network (WLAN) state 450 which can include a Bluetooth state in addition to the WLAN state, a packet error rate (PER) indicating radio frequency conditions at 460, an internal inter-process communications state at 470, a role parameter associated with a device at 480, and/or a number of active connections at 490. The AVPR 440 can command the bitpool adjuster 430 to adjust audio quality in view of one or more of the control inputs 410. The convergence control 420 can dynamically vary one or more parameters (e.g., rate, number of iterations, thresholds and the like) of an adjustment method implemented by the bitpool adjuster 430. The convergence control 420 can set such parameter(s) based on the control inputs 410 such as disclosed herein. Thus, the convergence control 420 can to control how quickly the bitpool adjuster stabilizes to a new value for the bitpool when detected conditions from the control inputs 410 change.

In each encoding cycle of the AVPR 440, the IPC buffer occupation described above with respect to FIG. 3 can be calculated in a buffer calculation function. The bitpool adjuster 430 can include a dynamic adjustment function that is called in order to adjust the bitpool as a function of the calculated buffer calculation. The bitpool can be adjusted in the resolution of an encoding cycle period, which can be a duration period of about 2.66 milliseconds for a typical Bluetooth network. A control mechanism such as the bitpool adjuster 430 can be utilized to dynamically control how the bitpool is adjusted based on wireless conditions as disclosed herein. For example, the bitpool adjuster can implement an algorithm that can converge to a bitpool number over a set of iterations, such by controlling the several factors including iterations number, the rate by which bitpool is increased or decreased, RF considerations (e.g., are RF conditions bad) and the state of adjacent WLAN networks, the state of Bluetooth network. The iterations number can correspond to the number of iterations the dynamic bitpool is changing up and down.

By way of example, in order for the bitpool value to converge the following iterations method can be implemented as machine readable instructions by the bitpool adjuster:

In iteration 1, decrease bitpool at high rate, or increase in very slow constant rate. In that manner, a quick response for a bad channel can be enabled.

In iteration 2, decrease bitpool at medium rate, or increase in very slow constant rate. Attempt to stabilize the bitpool value after the first strong decrease.

Iteration 3, decrease bitpool at low rate, or increase in very slow constant rate. Apply final stabilization effort.

If IPC buffer occupation is above a 'decrease threshold' for more than X frames, X being a positive integer, decrease bitpool and start iterations from the beginning. In this manner, a quick response for a bad channel can be enabled after the bitpool value was stabilized for the first time.

As mentioned above, the bitpool adjuster can control how the method is implemented based on bitpool adjustment parameters. For example, an increase/decrease rate parameter can be set to define the number of encoding cycles passes between one bitpool increase/decrease to another. A bad RF consideration parameter can be used for multiple SNK applications, such that the bitpool is not changed if only one SNK suffers from bad RF. This condition facilitates that the audio quality of one SNK headset would not be utilized to decrease the audio quality of the other one, for example.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be stored in memory as machine readable instructions. The machine readable instructions corresponding to the method can also be executed by a processor in a wireless device, such as a cell phone, for example.

FIG. 5 illustrates an example method 500 that provides dynamic audio control for bandwidth compensation. The method 500 determines a radio frequency (RF) bandwidth from a control input (e.g., calculated based on space occupied in an interprocessor communication buffer). The RF bandwidth can be employed to deliver a wireless audio stream to at least one sink device at 510. At 520, the method 500 generates an output control signal based on the RF bandwidth and wireless condition status from at least one other control input. At 530, the method 500 determines if the bitpool setting should be adjusted. For example, a bitpool adjuster (e.g., bitpool adjuster 210 of FIG. 2) can determine if the determined RF bandwidth (e.g., buffer occupation) is above or below one or more predetermined thresholds, which thresholds can be utilized to define acceptable delivery quality for the audio stream. If the bitpool setting should be adjusted at 530, the method 500 adjusts a bitpool setting, based on the output control signal, for delivery of the wireless audio stream at 540. The method 500 can return to 520 for further evaluation. The acts of 520, 530, and 540 of the method 500 can be repeated until a convergence of the bitpool is achieved as described below with respect to FIG. 5. If the bitpool setting should not be adjusted at 530 based on the control inputs, then the method 500 maintains the bitpool setting for delivery of the wireless audio stream at 550. One or more parameters of the method can be controlled based on control inputs, as disclosed herein.

The control inputs can include a wireless local area network (WLAN) state, a Bluetooth state, a packet error rate (PER) indicating radio frequency conditions, an internal inter-process communications state, a role parameter associated with a device, or a number of active connections. The method 500 can also include controlling a subband codec (SBC) setting to adjust audio quality that includes a sampling frequency parameter, a frame length parameter, or a resulting bit rate parameter. The method 500 can include tracking an inter-process communications state over time and decreasing a bitpool size when the size is above a decrease threshold or increasing the bitpool size when the size is below an increase threshold. The method 500 can include applying an iterations number parameter to control the number of times that the bitpool size increases or decreases. This can include applying a rate parameter that defines the number of encoding cycles that pass between bitpool size increases or decreases. The method 500 can also include applying a radio frequency consideration parameter where multiple sink devices are considered and if only one sink is affected by faulty RF conditions, then the bitpool size remains unchanged.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a controller that provides an output control signal based on one or more control inputs, the controller determines an indication of radio frequency (RF) bandwidth availability based on a given one of the control inputs, the output control signal corresponding to the RF bandwidth availability and status of at least one other wireless condition affecting RF bandwidth, the controller including an audio and voice processor (AVPR) that tracks inter-process communications states over time and decreases a bitpool value when the bandwidth availability is above a decrease threshold or increases the bitpool value when the bandwidth availability is below an increase threshold;
   a convergence control to facilitate that the bitpool value converges to a stable level; and
   an audio quality adjuster to adjust quality parameters used to encode an audio stream for one or more audio sinks based on the output control signal.

2. The system of claim 1, wherein the control inputs include a wireless local area network (WLAN) state, a Bluetooth state, a packet error rate (PER) indicating radio frequency conditions, an internal inter-process communications state, a role parameter associated with a device, or a number of active connections.

3. The system of claim 1, wherein the audio quality adjuster controls a bitpool parameter for audio quality that is dependent on the RF bandwidth availability and the at least one other wireless condition affecting the RF bandwidth.

4. The system of claim 3, wherein the audio quality adjuster controls a subband codec (SBC) setting according to the bitpool parameter to dynamically adjust the audio quality, the SBC setting comprising a sampling frequency parameter, a frame length parameter, or a resulting bit rate parameter.

5. The system of claim 1, wherein the convergence control includes an iterations number parameter to control a number of times that the bitpool value increases or decreases before convergence.

6. The system of claim 1, wherein the convergence control includes a rate parameter that determines a rate at which the bitpool value changes from one bitpool increase or decrease to a next bitpool increase or decrease.

7. The system of claim 1, wherein the convergence control includes a radio frequency consideration parameter where multiple sink devices are considered and if only one sink is affected by faulty RF conditions, then the bitpool value remains unchanged.

8. The system of claim 1, wherein the bitpool value is increased or decreased in a period from about two milliseconds to about three milliseconds.

9. A method comprising:
   determining a radio frequency (RF) bandwidth from a control input, wherein the RF bandwidth is employed to deliver a wireless audio stream to at least one sink device;
   generating an output control signal based on the RF bandwidth and wireless condition status from at least one other control input;
   dynamically adjusting a bitpool setting in response to the output control signal to control a quality of the wireless audio stream;
   tracking an inter-process communications state over time and decreasing a bitpool value when the bitpool value is above a decrease threshold or increasing the bitpool value when the bitpool value is below an increase threshold; and
   applying an iterations number parameter to control a number of times that the bitpool value increases or decreases before convergence.

10. The method of claim 9, wherein the control inputs include at least one of a wireless local area network (WLAN) state, a Bluetooth state, a packet error rate (PER) indicating radio frequency conditions, an internal inter-process communications state, a role parameter associated with a device, or a number of active connections.

11. The method of claim 9, further comprising controlling a subband codec (SBC) setting to adjust audio quality that includes a sampling frequency parameter, a frame length parameter, or a resulting bit rate parameter.

12. The method of claim 9, further comprising applying a rate parameter that determines a rate at which the bitpool value changes from one bitpool increase or decrease to a next bitpool increase or decrease.

13. The method of claim 9, further comprising applying a radio frequency consideration parameter where multiple sink devices are considered and if only one sink is affected by faulty RF conditions, then the bitpool value remains unchanged.

14. A device comprising:
   an audio and voice processor (AVPR) to communicate to a host system to determine available radio frequency (RF) bandwidth and at least one other wireless condition affecting the RF bandwidth;

a Bluetooth central processing unit (CPU) that communicates with the AVPR to deliver audio streams to one or more audio sinks;

a bitpool adjuster associated with the AVPR and programmed to adjust a bitpool value of the audio streams based on the available RF bandwidth and the at least one other wireless condition affecting the RF bandwidth; and a convergence control to modify parameters of the bitpool adjuster to facilitate convergence of the bitpool value according to the at least one other wireless condition.

15. The device of claim 14, wherein the at least one other wireless condition is determined from a wireless local area network (WLAN) state, a Bluetooth state, a packet error rate (PER) indicating radio frequency conditions, an internal inter-process communications state, a role parameter associated with a device, or a number of active connections.

\* \* \* \* \*